(12) United States Patent
Hägebarth

(10) Patent No.: US 6,790,044 B1
(45) Date of Patent: Sep. 14, 2004

(54) PROCESS FOR THE AUTOMATIC CREATION AND MONITORING OF A PROGRESS PLAN FOR A TRAINING COURSE BY A COMPUTER

(75) Inventor: Frank Hägebarth, Kirchheim (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/440,690

(22) Filed: Nov. 16, 1999

(30) Foreign Application Priority Data

Nov. 17, 1998 (DE) .......................................... 198 52 896

(51) Int. Cl.⁷ ................................................. G09B 7/00
(52) U.S. Cl. ....................... 434/322; 434/323; 434/335; 434/362
(58) Field of Search ................................. 434/323, 327, 434/335, 336, 351, 352, 353, 322, 350, 362

(56) References Cited

U.S. PATENT DOCUMENTS

| | | | | | |
|---|---|---|---|---|---|
| 5,270,920 | A | * | 12/1993 | Pearse | 364/401 |
| 5,727,950 | A | * | 3/1998 | Cook | 434/350 |
| 6,002,915 | A | * | 12/1999 | Shimizu | 434/350 |
| 6,012,037 | A | * | 1/2000 | Yoshikawa | 705/8 |
| 6,019,607 | A | * | 2/2000 | Jenkins | 434/116 |
| 6,047,260 | A | * | 4/2000 | Levinson | 705/9 |
| 6,052,512 | A | * | 4/2000 | Peterson | 395/200.5 |
| 6,353,447 | B1 | * | 3/2002 | Truluck | 345/733 |

FOREIGN PATENT DOCUMENTS

| | | |
|---|---|---|
| DE | 4018079 A1 | 12/1991 |
| DE | 4018080 A1 | 12/1991 |
| DE | 19634138 A1 | 2/1998 |
| DE | 29801655 U1 | 7/1998 |
| EP | 0 710 943 A2 | 5/1996 |
| EP | 0 838 798 A1 | 4/1998 |
| GB | 2 321 120 A | 7/1998 |
| WO | WO 97/44767 | 11/1997 |
| WO | WO 98/43223 | 10/1998 |

* cited by examiner

*Primary Examiner*—Kurt Fernstrom
(74) *Attorney, Agent, or Firm*—Sughrue Mion, PLLC

(57) ABSTRACT

The invention relates to a process (1) for the automatic creation and monitoring of a progress plan for a training course comprising at least one training unit by a computer. To increase the efficiency of the training course in a process (1), the invention proposes a process (1) which is characterised by the following steps:

definition of first time units by the computer (2), definition of second time units by the computer (4), creation of a progress plan by the computer for the execution of the training course in dependence upon the first time units and the second time units (5), where for each training unit the progress plan specifies a time by which it is to be completed and monitoring by the computer as to whether the corresponding training unit has been completed by the time specified in the progress plan (7).

24 Claims, 1 Drawing Sheet

PROCESS FOR THE AUTOMATIC CREATION AND MONITORING OF A PROGRESS PLAN FOR A TRAINING COURSE BY A COMPUTER

BACKGROUND OF THE INVENTION

The present invention relates to a process for the automatic creation and monitoring of a progress plan for a training course comprising at least one training unit by a computer.

The present invention further relates to a computer for the automatic creation and monitoring of a progress plan for a training course comprising at least one training unit.

The computer in which such a process is implemented is generally a microcomputer, in particular a personal computer (PC). A process of the above mentioned type is used in the framework of computer-assisted learning or computer-based training (CBT). CBT is the generic term for interactively imparting knowledge by means of a computer. From the prior art a CBT process is known which operates off-line and which, from a local storage medium, for example a CD-ROM, makes the training units of the training course available to the trainee on a display unit of the computer for study purposes. However, CBT processes are also known which utilize the facilities of modern computer networks, for example an in-house intranet or the worldwide internet, to present the training units of the training course. In the CBT processes which operate using computer networks, a specific computer in the computer network, the so-called server, is accessed by the trainee via his computer by means of the computer network. The training units of the training courses, the training environment, and functions for the management of the training courses are stored in the server.

In the known CBT processes, the trainee himself determines whether, and at which times, he would like to study a training course he has commenced. The study activity of the trainee, in particular his work input into the training course, is not monitored. The trainee must himself plan, coordinate and monitor his progress through the individual training units.

The known CBT processes are shifting the training process increasingly into the area of responsibility of the trainee. A very high degree of self-initiative, self-discipline and learning ability is demanded of the trainee.

One of the greatest problems here resides in the motivation of the trainee to study the training course over a relatively long time interval with uniform input. In the starting phase the novel training method of CBT is of interest to the trainee. However, most training courses extend over a long time interval which can involve a plurality of training units and a plurality of sittings. At each sitting the trainee spends a specified period of time studying the training course. The study time for the training course can extend over days (for example to train sales personnel to sell new products), weeks, or even months (for example to learn a new foreign language).

Over relatively long time intervals the trainee's motivation often falls considerably as, in contrast to a taught training course, so-called classroom training, in CBT a course leader who can monitor, urge on, or motivate the trainee is not normally present. In CBT the trainee is himself responsible for the planning and coordination of the training course. However, it is difficult to plan accurately in advance for such long time intervals. For this reason, often no progress plan is created for the training course. When the trainee has the time and inclination, he studies one or more training units of the training course. Because of this problem, once commenced a CBT process often is continued only with a struggle or is discontinued entirely. Consequently classroom training is often considerably more efficient and results in better training success for the trainee than CBT.

SUMMARY OF THE INVENTION

An object of the present invention is therefore to design and further develop a process of the type referred to in the introduction so as to increase the efficiency of the training course.

To achieve this object, commencing from the process of the type referred to in the introduction, the invention proposes a process which is characterised by the following steps:

definition by the computer of first time units which represent the time periods which a trainee would like to spend on the training course, definition by the computer of second time units which represent the time periods required to execute the training units of the training course, creation by the computer of a progress plan for the execution of the training course in dependence upon the first time units and the second time units, where for each training unit the progress plan specifies a time by which the trainee is expected to have completed the corresponding training unit and monitoring by the computer as to whether the corresponding training unit has been completed by the time specified in the progress plan.

In accordance with the invention, it has been recognised that the efficiency of CBT processes can be particularly increased by monitoring the study activity of the trainee, in particular the time input by the trainee into studying the training units of the training course. In contrast to classroom training, no course leader is required to monitor the trainee. Rather, the monitoring is performed automatically by a computer. For the monitoring of the trainee, firstly a progress plan for the execution of the training course is created on the basis of information provided by the trainee or on the basis of information stored in the computer. During the training course the computer then monitors that this progress plan is adhered to.

In the process according to the invention, in particular the following steps are executed. At the start of a training course the computer asks the trainee which training course he would like to study. The trainee also indicates the length of time within which he would like to complete the training course. Finally the trainee specifies first time units which represent the time periods he would like to spend on the training course within this length of time. The first time units comprise for example the number of hours each day for which the trainee wishes to study or information as to whether he wishes to study at weekends or on holidays.

The first time units can be defined by direct inputting of the required time information by the trainee. However, it is also conceivable for the computer to provide different personal categories for selection by the trainee. Each of these personal categories is associated with specific learning behaviour patterns, in particular first time units. To define the first time units, the trainee simply selects one of these personal categories.

The computer also defines the second time units which represent the time periods required to execute the training units of the training course. The second time units can either be predefined in the computer or are assigned to the personal categories stored in the computer and are defined on the basis of the personal category selected by the trainee. Finally it is also conceivable for the trainee to individually input the time which he believes he will require to study a training course.

In dependence upon the first time units and the second time units, the computer then automatically creates a progress plan for the execution of the training course. The progress plan precisely specifies which training unit is to be made available to the trainee at which time. For each training unit, the progress plan also specifies a time by which the trainee is expected to have completed the corresponding training unit.

During the progression of the training course the computer monitors whether the corresponding training unit has been completed by the time specified in the progress plan. If the progress plan is not adhered to, the computer can implement suitable measures. Similarly as in the case of a course leader in classroom training, these measures can consist of drawing the trainee's attention to the time delay, presenting the trainee with additional units to be studied as a penalty, extending the duration of the training course or, as a last resort, excluding the trainee from the training course.

By means of the process according to the invention, for the first time it is possible to monitor the time input by the trainee without a course leader. In this way the motivation of the trainee, and the training success attainable by means of CBT, can be decisively increased. The process according to the invention has a particularly high degree of efficiency as it combines the advantages of classroom training (monitoring of the work input by the trainee) with the advantages of CBT (captivation of the trainee by appealing multimedia presentation of the training units).

In accordance with an advantageous further development of the invention, it is proposed that the trainee be notified if the corresponding training unit has not been completed by the time specified in the progress plan. Often the trainee only becomes aware of his deficiency when notified.

Moreover, the trainee is generally encouraged by the notification to spend more time on the training course. The trainee has the sense that he is being monitored and develops an ambition to adhere to the time specifications for the training course. As a result he will again work harder on the training course.

In accordance with an advantageous embodiment, it is proposed that the result of the monitoring is stored. The stored monitoring results can then be accessed at any time.

They can be used to create a type of certificate at the end of the training course or to allow the trainee, during the training course, to check on his advancement or level in the training course. When several trainees are working independently on a common training course, in CBT normally there is hardly any sense of competition as one trainee generally receives no information from the other trainees.

To foster a sense of competition between several trainees, and thus greater input, the monitoring results of the trainees can also be publicised so as to be accessible to each trainee on a training course. The publication can take place for example on a blackboard or on a specified web page of a computer network to which all subscribers to a training course have access.

To enable the progress plan to be adapted to new factors during the training course, in accordance with an advantageous further development it is proposed that the progress plan be recreated if the corresponding training unit has not been completed by the time specified in the progress plan. In this way the trainee is not subjected to excessive time pressure if he cannot adhere to the times specified for a training unit by the progress plan. Instead, the progress plan is adapted to the new factors, for example in that the time by which the trainee is expected to have completed the corresponding training unit is postponed.

In the recreation of the progress plan, new values for the first and second time units can be taken into account. This can be useful if it is anticipated that in future the trainee will be able to spend less time on the training course. It is also conceivable for the progress plan to be recreated if new factors arise which affect the time frame for the training course set in the progress plan, for example if the trainee wishes to complete the training course within a shorter time interval than originally provided.

In accordance with a particularly preferred further development, it is proposed that the training course be terminated if, more than once, the corresponding training unit has not been completed by the time specified in the progress plan. The number of times the time specified in the progress plan can be overshot before the training course is terminated can be freely determined. In the case of very strict handling of the process, it is conceivable for the training course to be terminated after just one overshooting of the time specified in the progress plan. A training course studied on a free-will basis can permit frequent overshooting of the specified time before the training course is terminated. Upon the resumption of the training course following the termination, the training course must again be worked through from the start. The trainee is preferably notified of the termination of the training course.

To inform the trainee what the training course progress plan is like, it is proposed that the progress plan is sent to the trainee following its creation. The trainee then has the option of preparing for specific training units.

In accordance with another, particularly preferred further development of the invention, it is proposed that the training units are made available to the trainee via a computer network.

Advantageously, the training units are made available to the trainee via an in-house computer network (intranet). Alternatively or additionally, it is proposed that the training units are made available to the trainee via a global computer network, in particular the internet.

Via the computer network, the trainee can advantageously be notified via electronic mail (e-mail) that the corresponding training unit has not been completed by the time specified in the progress plan, or that the training course has been terminated. In accordance with a preferred embodiment, the progress plan can also be sent to the trainee via electronic mail (e-mail). Alternatively, it is proposed that the progress plan be made available on a web page to which the trainee has access. The study progress of the trainee, or other information relating to the training course, can also be made available on the web page.

The implementation of the process according to the invention in the form of a control element for a computer is of particular significance. Here the control element stores a program which can run on the computer and is suitable to execute the process according to the invention.

Thus in this case the invention is implemented by a program stored on the control element so that this control element, provided with the program, constitutes the invention in the same way as the process which the program is suitable to execute. An electric storage medium, for example a compact disc (CD), floppy disc or the like, can be used in particular as control element.

A further object of the present invention consists in designing and further developing a computer of the type referred to in the introduction so as to increase the efficiency of the training course.

To achieve this object, commencing from the computer of the type referred to in the introduction, the invention proposes that the computer should comprise:

- means for defining first time units which represent the time periods which a trainee would like to spend on the training course,
- means for defining second time units which represent the time periods required to execute the training units of the training course,
- means for creating a progress plan by the computer for the execution of the training course in dependence upon the first time units and second time units where, for each training unit, the progress plan specifies a time by which the trainee is expected to have completed the corresponding training unit and
- means for monitoring by the computer whether the corresponding training unit has been completed by the time specified in the progress plan.

In accordance with a preferred further development, it is proposed that the computer comprises means for notifying the trainee if the corresponding training unit has not been completed by the time specified in the progress plan.

Advantageously, the computer comprises means for storing the monitoring result.

In accordance with a preferred embodiment, the computer comprises means for sending the progress plan to the trainee following its creation.

In accordance with another further development of the present invention, the computer is connected to a computer network. The computer is preferably connected to an in-house computer network (intranet). Alternatively, it is proposed that the computer is connected to a global computer network, in particular the internet.

BRIEF DESCRIPTION OF THE DRAWING

In the following a preferred embodiment of the present invention will be explained in detail making reference to the drawing in which.

DETAILED DESCRIPTION OF THE INVENTION

Figure 1:
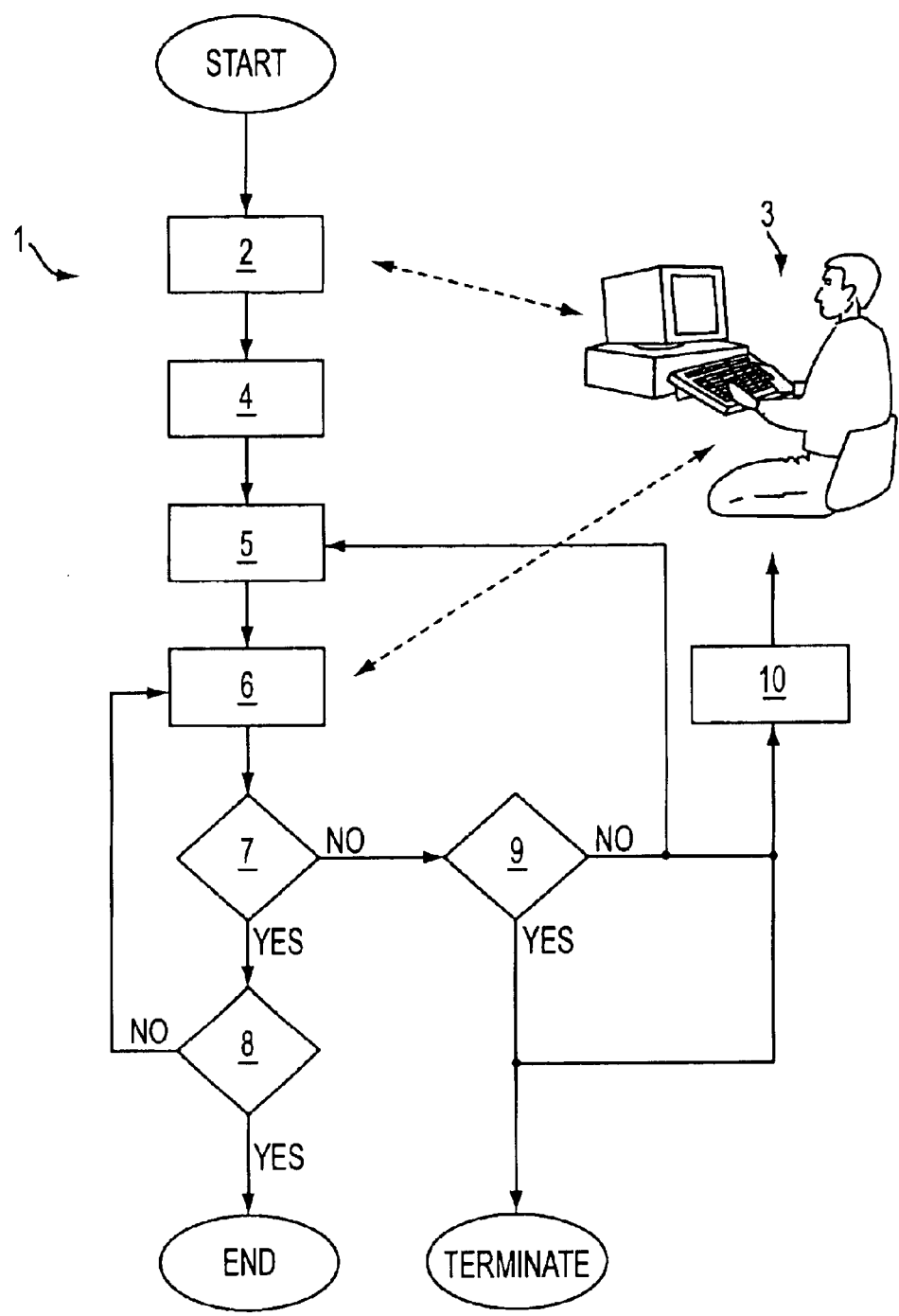
FIG. 1 is a flow diagram of the process according to the invention.

In FIG. 1 the process according to the invention has been provided with the overall reference symbol 1. The process 1 serves for the automatic creation and monitoring by a computer of a progress plan for a training course comprising at least one training unit. At the start of the process 1, in a step 2 first time units are defined which represent the time periods a trainee 3 would like to spend on the training course. As shown in FIG. 1, the first time units can be defined by the computer by interaction (broken line) with the trainee 3. However, the first time units can also be automatically defined by the computer. Thus the computer can define specified values for the first time units, for example in accordance with a personal category to which the trainee belongs.

In a following step 4, second time units are automatically defined by the computer. The second time units represent the time periods necessary to execute the training units of the training course.

In a following step 5, a progress plan is automatically created by the computer. For each training unit, the progress plan specifies a time by which the trainee 3 is expected to have completed the corresponding training unit.

In a following step 6 of the process 1, the first training unit of the training course is made available. This training unit is studied or executed by the trainee 3 interactively (broken line). In a following enquiry 7 it is checked whether the first training unit has been completed by the time specified in the progress plan. If this is the case, in a following enquiry 8 it is checked whether all the training units of this training course have already been made available to the trainee 3. If this is not the case, at this point the process branches to step 6 and makes the next training unit available to the trainee.

If the training unit has not been completed by the specified time (enquiry 7), in a further enquiry 9 it is checked whether this has already occurred more than once. If this is the case, the training course is terminated at this point and a corresponding notification is sent to the trainee 3 (step 10). If this has not already occurred more than once, in the step 10 the trainee 3 is sent a notification informing him that he has not completed the corresponding training unit by the time specified in the progress plan. Additionally, the process 1 branches at this point to the step 5 in which a new progress plan is then created. In the new progress plan, those training units which have not yet been studied are collectively put back in time, or else longer time intervals are set between the training units which have not yet been studied. In the following step 6, the trainee 3 is presented with the training unit which he has not yet studied. The creation of a new progress plan in step 5 has no influence upon the sequence of the training units of the training course. Only when one training unit has been completed is the next training unit made available to the trainee.

When all the training units of the training course have been made available to the trainee 3 (enquiry 8), the training course comes to an end.

It is conceivable that, following the creation of a progress plan (step 5), the progress plan is sent to the trainee 3 (not shown). The training units are made available to the trainee 3 via a computer network (step 6).

The computer network can have the form of an in-house intranet or the world-wide internet.

The notification of the trainee 3 (step 10) that he has not completed the corresponding training unit by the time specified in the progress plan, or that the training course is being terminated can take place via electronic mail (e-mail).

What is claimed is:

1. A process for the automatic creation and monitoring of a progress plan for a training course including at least one training unit by a computer, comprising:

- requesting a trainee to specify a length of time within which the trainee selects to complete the training course;
- requesting the trainee to specify first time units that represent increments of time which the trainee selects to spend on the training course within said length of time;
- defining second time units that differ from the first time units and represent increments of time required by the trainee to actually execute the training units of the training course;
- wherein, in response to said requested first time units and said defined second time units, the computer automatically;

creates a progress plan for the execution of the training course in dependence upon the first time units and the second time units, wherein for each training unit the progress plan specifies a time by which the trainee is to have completed the corresponding training unit; and monitors as to whether the corresponding training unit has been completed by the time specified in the progress plan.

2. A process for the automatic creation and monitoring of a progress plan for a training course according to claim 1, wherein the computer automatically notifies the trainee when the corresponding training unit has not been completed by the time specified in the progress plan.

3. A process for the automatic creation and monitoring of a progress plan for a training course according to claim 1, wherein the computer automatically stores a monitoring result.

4. A process for the automatic creation and monitoring of a progress plan for a training course according to claim 1, wherein the computer automatically recreates the progress plan when the training unit has not been completed by the time specified in the progress plan.

5. A process for the automatic creation and monitoring of a progress plan for a training course according to claim 4, wherein the computer automatically terminates the training course when, more than once, the corresponding training unit has not been completed by the time specified in the progress plan.

6. A process for the automatic creation and monitoring of a progress plan for a training course according to claim 5, wherein the computer automatically notifies the trainee of a termination of the training course.

7. A process for the automatic creation and monitoring of a progress plan for a training course according to claim 1, wherein the computer automatically sends the progress plan to the trainee after its creation.

8. A process for the automatic creation and monitoring of a progress plan for a training course according to claim 7, wherein in said sending comprises, making the training units available to the trainee via a computer network.

9. A process for the automatic creation and monitoring of a progress plan for a training course according to claim 8, wherein in said sending comprises, making the training units available to the trainee via at least one of an in-house computer network, a global computer network, an Intranet, or the Internet.

10. A process for the automatic creation and monitoring of a progress plan for a training course according to claim 9, further comprising notifying the trainee via electronic mail when the corresponding training unit has not been completed by the time specified in the progress plan or that the training course has been terminated.

11. A process for the automatic creation and monitoring of a progress plan for a training course according to claim 9, further comprising sending the progress plan to the trainee via electronic mail.

12. A process for the automatic creation and monitoring of a progress plan for a training course according to claim 9, further comprising making available the progress plan on a web page to which the trainee has access.

13. A process for the automatic creation and monitoring of a progress plan for a training course according to claim 1, wherein said training course includes a plurality of training units.

14. A process for the automatic creation and monitoring of a progress plan for a training course according to claim 1, wherein said first time units comprise a number of hours each day the trainee selects to spend on the training course, and wherein the process further comprises:

requesting the trainee to specify whether the trainee is available to study at weekends or on holidays, wherein when the computer automatically creates said progress plan in dependence upon the first time units and the second time units, the progress plan is in further dependence upon whether the trainee is available to study at weekends or on holidays.

15. A program product for enabling a computer to perform the automatic creation and monitoring of a progress plan for a training course comprising:

a computer readable medium, and instructions on said computer readable medium for executing the following steps;

requesting a trainee to specify a length of time within which the trainee selects to complete the training course;

requesting the trainee to specify first time units that represent increments of time which the trainee to selects to spend on the training course within said length of time;

defining second time units that differ from the first time units and represent increments of time required by the trainee to actually execute the training units of the training course;

wherein, in response to said requested first time units and said defined second time units, the computer automatically;

creates a progress plan for the execution of the training course in dependence upon the first time units and the second time units, wherein for each training unit the progress plan specifies a time by which the trainee is to have completed the corresponding training unit; and monitors as to whether the corresponding training unit has been completed by the time specified in the progress plan.

16. A program product for enabling a computer to perform the automatic creation and monitoring of a progress plan for a training course according to claim 15, wherein the program product is a compact disc or floppy disc.

17. A computer for the automatic creation and monitoring of a progress plan for a training course comprising at least one unit, characterized in that the computer comprises:

means for defining first time units that represent time periods which a trainee specifies to spend on a training course;

means for defining second time units that represent time periods required to execute training units of the training course;

means for creating a progress plan for the execution of the training course in dependence upon the first time units and the second time units, wherein for each training unit the progress plan specifies a time by which the trainee is to have completed the corresponding training unit; and means for monitoring as to whether the corresponding training unit has been completed by the time specified in the progress plan.

18. A computer for the automatic creation and monitoring of a progress plan for a training course according to claim 17, further comprising a means for notifying the trainee when the corresponding training unit has not been completed by the time specified in the progress plan.

19. A computer for the automatic creation and monitoring of a progress plan for a training course according to claim 17, further comprising a means for storing a monitoring result.

20. A computer for the automatic creation and monitoring of a progress plan for a training course according to claim 17, further comprising a means for sending the progress plan to the trainee after its creation.

21. A computer for the automatic creation and monitoring of a progress plan for a training course according to claim 17, wherein the computer is connected to a computer.

22. A computer for the automatic creation and monitoring of a progress plan for a training course according to claim 21, wherein the computer is connected to at least one of an in-house computer network and a global computer network.

23. A process for the automatic creation and monitoring of a progress plan for a training course including a plurality of training units by a computer, comprising:

- requesting a trainee to specify a length of time within which the trainee selects to complete the training course;
- presenting a trainee a plurality of categories for selection by the trainee, each category being associated with specific learning behavior patterns;
- defining, based upon the category selected by the trainee, first time units that represent increments of time for the trainee to spend on the training course within the said length of time;
- defining second time units that differ from the first time units and represent increments of time required by the trainee to actually execute the training units of the training course;
- wherein, in response to said defined first time units and said defined second time units, the computer automatically:
- creates a progress plan for the execution of the training course in dependence upon the first time units and the second time units, wherein for each training unit the progress plan specifies a time by which the trainee is to have completed the corresponding training unit; and
- monitors as to whether the corresponding training unit has been completed by the time specified in the progress plan.

24. A process for the automatic creation and monitoring of a progress plan for a training course according to claim 23, further comprising the computer automatically:

- implementing measures to motivate the trainee if the corresponding training unit has not been completed by the time specified in the progress plan, said measures selected from the group consisting of drawing attention of the trainee to the time delay, presenting the trainee with additional units to be studied as a penalty, extending a duration of the training course, excluding the trainee from the training course, and a combination thereof.

* * * * *